(12) United States Patent
Peltonen

(10) Patent No.: US 7,327,222 B2
(45) Date of Patent: Feb. 5, 2008

(54) TRANSMISSION SYSTEM FOR TRANSMITTING DATA VIA CURRENT CONDUCTING BRANCHES

(75) Inventor: Pentti Peltonen, Helsinki (FI)

(73) Assignee: Nokia Corporation, Espoo (FI)

( * ) Notice: Subject to any disclaimer, the term of this patent is extended or adjusted under 35 U.S.C. 154(b) by 601 days.

(21) Appl. No.: 10/496,266

(22) PCT Filed: Nov. 29, 2001

(86) PCT No.: PCT/EP01/13984

§ 371 (c)(1),
(2), (4) Date: May 20, 2004

(87) PCT Pub. No.: WO03/047122

PCT Pub. Date: Jun. 5, 2003

(65) Prior Publication Data

US 2004/0258165 A1  Dec. 23, 2004

(51) Int. Cl.
*G05B 11/01* (2006.01)
(52) U.S. Cl. .......................... 340/310.11; 340/310.12; 340/310.16; 340/538; 340/538.11; 340/538.15
(58) Field of Classification Search .......... 340/310.11, 340/310.12, 310.16, 538, 533, 538.11, 538.15
See application file for complete search history.

(56) References Cited

U.S. PATENT DOCUMENTS

| 4,962,529 | A | * | 10/1990 | Saeki et al. | 380/226 |
| 5,255,086 | A | * | 10/1993 | McMullan et al. | 725/131 |
| 5,991,308 | A | * | 11/1999 | Fuhrmann et al. | 370/395.53 |
| 6,356,555 | B1 | * | 3/2002 | Rakib et al. | 370/441 |

FOREIGN PATENT DOCUMENTS

| EP | 0 339 201 A2 | 2/1989 |
| EP | 0 387 498 A2 | 1/1990 |
| EP | 0 777 311 A2 | 6/1997 |
| JP | 2001197074 | 7/2001 |
| WO | 01/63821 A2 | 8/2001 |

* cited by examiner

*Primary Examiner*—Daryl C Pope
(74) *Attorney, Agent, or Firm*—Lackenbach Siegel LLP; Robert M. Bauer

(57) ABSTRACT

A system and method for transmitting and receiving data between a power supply and a remotely located load, by use of standard data communication cable has functional data transmitted via the power line of such data communication cable in order to decrease the number of required conductors. This auxiliary data is encoded by altering the current balance between two conductors, conducting a current I from the receiver to the transmitter or vice versa in two branches.

49 Claims, 4 Drawing Sheets

TRANSMISSION SYSTEM FOR TRANSMITTING DATA VIA CURRENT CONDUCTING BRANCHES

FIELD OF THE INVENTION

The present invention relates to a transmission system, in particular comprising a remotely located device and a centralized power feed device, both comprising a transmitter and a receiver for transmitting data via a cable comprising at least two conductors for conducting a current from a receiver to a transmitter or vice versa, wherein said current being divided in two branches, each branch for one of the conductors.

BACKGROUND OF THE INVENTION

In wireless router networks several wireless routers are provided that are connected with radio links in order to establish data communication from a user personal computer (PC) or local area network (LAN) to other larger networks, e.g. to the Internet. Such wireless routers are usually located on the roof of a building or the like and thus remotely located from any electrical or electronic equipment, in particular from any indoor mains power supply. Thus, power has to be fed from a separate power supply unit to the router via a special power line.

In such wireless router networks the wireless router may be embodied as a rooftop subscriber unit (SU) or airhead unit (AH). Such SU or AH is located maximally at a 50-meter distance from an interface and power supply unit. Such an interface and power supply unit is regularly further cabled to a user PC interface. To avoid the use of a separate power supply on the roof of the building, the SU or AH receives its power from the interface and power supply unit which in turn receives power from an indoor mains power supply, which is located near the interface and power supply unit. The power is fed to the SU or AH through the same cable carrying the data between the SU/AH and the interface and power supply unit. The data transmission method for the transmission of this data is either an 10/100 Ethernet or a Home PNA (Phoneline Networking Alliance) connection.

In addition to corresponding Ethernet or Home PNA interfaces the SU/AH needs extra interfaces to receive power from the interface and power supply unit. Furthermore, a user and service personnel frequently needs extra information about the status of the SU/AH and auxiliary functional user and maintenance data. For this purpose the interface and power supply unit is commonly equipped with some light emitting diodes (LEDs) to indicate the basic functionality of the router, like power on/off, ongoing data traffic, and diagnostic information. This additional information has to be transmitted from the SU/AH to the user and hence to the interface and power supply unit. Typically this requires additional interfaces in both units and additional wires in the data communication cable.

Commonly any extra data transferred between the SU/AH and the interface and power supply unit has been using a parallel interface and a separate wire for every bit of information. This is a very straight forward implementation but it requires extra wires in the data communication cable. Furthermore, all interfaces in both ends of the cable have to be protected against energetic surges, which considerably increases the costs and complexity of the otherwise simple and inexpensive interface circuitry.

Data communication cables readily available on electronics retail markets suitable for Ethernet links contain maximally four twisted pairs. However, at the present, the SU/AH requires a cable with seven pairs to carry the data, power, and auxiliary indicator data from the SU/AH to the interface and power supply unit. This requirement leads to a customized cable, which is not readily available and must therefore always be delivered with the router. Using such a customized cable with extra pairs increases costs considerably.

Furthermore, the assembly conditions vary and the length of the cable cannot easily be estimated before the actual assembly work. This leads to the need of purchasing excessive cable lengths, which further increases costs.

Furthermore, cable conduits are often so narrow that a ready-made cable with a connector pre-assembled to the customized cable cannot be pulled through the cable conduit. This may lead in some cases to the requirement of assembling a connector on the roof, which may be difficult due to the required special tools and in some cases due to adverse weather and difficult working conditions.

The ideal case would be that the cable can be purchased locally, assembled quickly and cut to the desired length at both ends with no special tools with minimal numbers of connections to be made on the installation site.

The above mentioned drawbacks may also occur in other areas with similar remotely located devices utilising centralised power feed systems through data communication cables.

SUMMARY OF THE INVENTION

It is therefore an object of the present invention to improve data communication between remotely located and centralized devices.

This object is achieved by a transmitter for transmitting data to a receiver via a cable, comprising at least two current conducting branches, wherein said cable comprises at least two conductors respectively connectable with said branches for conducting a current either from said receiver to said transmitter or vice versa, said current being divided in said two branches, a first branch for a first one of said conductors and a second branch for a second one of said conductors, and means for encoding data to be transmitted via said cable to said receiver by altering the current balance between the currents in said two branches.

Furthermore, the above object is achieved by a receiver for receiving data from a transmitter via a cable, comprising at least two current conducting branches, wherein said cable comprises at least two conductors respectively connectable with said branches for conducting a current either from said receiver to said transmitter or vice versa, said current being divided in said two branches, a first branch for a first one of said conductors and a second branch for a second one of said conductors, and means for decoding data being transmitted via said cable from said transmitter by evaluating alterations of the current balance between the currents in said two branches.

Furthermore, the above object is achieved by a transmission apparatus comprising such a transmitter, an electrical unit comprising a load or a power supply, wherein said transmitter being connected in series between said at least two conductors and said electrical unit, and wherein said conductors are at least part of a positive power line feeding a current from said power supply to said load or at least part of a negative power line returning said current from said load to said power supply.

Furthermore, the above object is achieved by a receiving apparatus comprising such a receiver, an electrical unit comprising a power supply or a load, wherein said receiver being connected in series between said at least two conductors and said electrical unit, and wherein said conductors are at least part of a positive power line feeding a current from said power supply to said load or at least part of a negative power line returning said current from said load to said power supply.

Furthermore, the above object is achieved by a transmission and receiving system for transmitting data, comprising such a transmission apparatus and such a receiving apparatus, wherein said transmission apparatus and said data receiving apparatus are connected with each other by said cable.

Furthermore, the above object is achieved by a method for transmitting data via a cable, said cable comprising at least two conductors for conducting a current either from a receiver to a transmitter or vice versa, said current being divided in two current conducting branches, a first branch for a first one said conductors and a second branch for a second one of said conductors, comprising the step of encoding data to be transmitted via said cable by altering the current balance between the currents in said two branches.

Furthermore, the above object is achieved by a method for receiving data via a cable, said cable comprises at least two conductors for conducting a current either from a receiver to a transmitter or vice versa, said current being divided in two current conducting branches, a first branch for a first one of said conductors and a second branch for a second one of said conductors, comprising a step of decoding data transmitted via said cable from said data transmitting apparatus by evaluating alterations of the current balance between the currents in said two branches.

The present invention enables to encode and to decode (auxiliary) user and maintenance data transmitted between a transmitter, such as comprised in a wireless router, e.g. a SU or AH, and a receiver, such as comprised in an interface and power supply unit for such a wireless router, using parallel power lines provided to carry power from one device to another, e.g. from the interface and power supply unit to the wireless router. The encoding and decoding is performed by altering a current balance between currents conducted in a pair of parallel conductors, wherein both conductors are carrying a current that is divided in two branches either from the receiver to the transmitter or vice versa. Such alterations of the current balance are independent of any variations of the total amount of current fed through the pair of conductors.

This idea of transmitting (auxiliary) data in a pair of conductors, in particular parallel power conductors, by encoding such data in alterations of the current balance in both conductors enables avoiding extra conductor pairs otherwise required to transfer this (auxiliary) data. E.g. the number of conductors needed between e.g. a SU/AH and an interface and power supply unit can be reduced significantly. Thus, as the cable commonly comprises twisted pairs of conductors, the number of pairs can be reduced correspondingly. E.g. if three signals indicating three different information are to be transmitted at least three conductors can be saved. If, however, twisted pair conductors are used, the number of conductor pairs can be reduced by two, resulting in a reduction of conductors by four. As a result, the invention allows the use of standard cables. Thus, standard installation equipment can be used for installation of data communication between remotely located and centralized devices.

Hence, the present invention provides the following advantages:

The present invention enables a reduction of conductor pairs in a data communication cable. Thus, the cable costs can be reduces considerably. As a result of the reduces number of conductors, customized cables can be replaced by standard cables. Such a replacement leads to a further considerable cost reduction.

Logistics can be simplified, since due to the present invention the cable can be purchased from a local dealer. Furthermore, stocking costs can be reduced due to the use of standard cables. Furthermore, global transportation of customized cables can be avoided due to the use of standard cables.

Furthermore, due to the reduced number of conductors, the cable weight and the use of copper is reduced.

Furthermore, due to the present invention, the number of cable interfaces and protection circuits can be reduced. Furthermore, the number of connector pins can be reduced. This allows cheaper connectors.

Furthermore, as customized conductor connections and complex connectors can be avoided, the installation and connection work can be simplified at both ends of the cable. Thus, the assembly time can be reduced.

Although the circuitries required by the present invention need extra components and associated protective devices, which complicates respective devices at both ends of the cable, the number of components can be, however, reduced, while maintaining about the same functionality, as no additional indicator interfaces for each auxiliary data is needed.

According to preferred embodiments the principle of the invention can be extended to several parallel similar circuits or the data can be converted into a serial format of any length to allow transmitting basically unlimited amount of information. Particularly, data can be transferred to both directions using half-duplex communication. By using two parallel connections a full-duplex communication can be implemented as well.

Further advantageous developments are defined in the dependent claims.

BRIEF DESCRIPTION OF THE DRAWINGS

In the following, the present invention will be described in greater detail based on preferred embodiments with reference to the accompanying drawings, in which.

DESCRIPTION OF THE PREFERRED EMBODIMENTS

Figure 1:
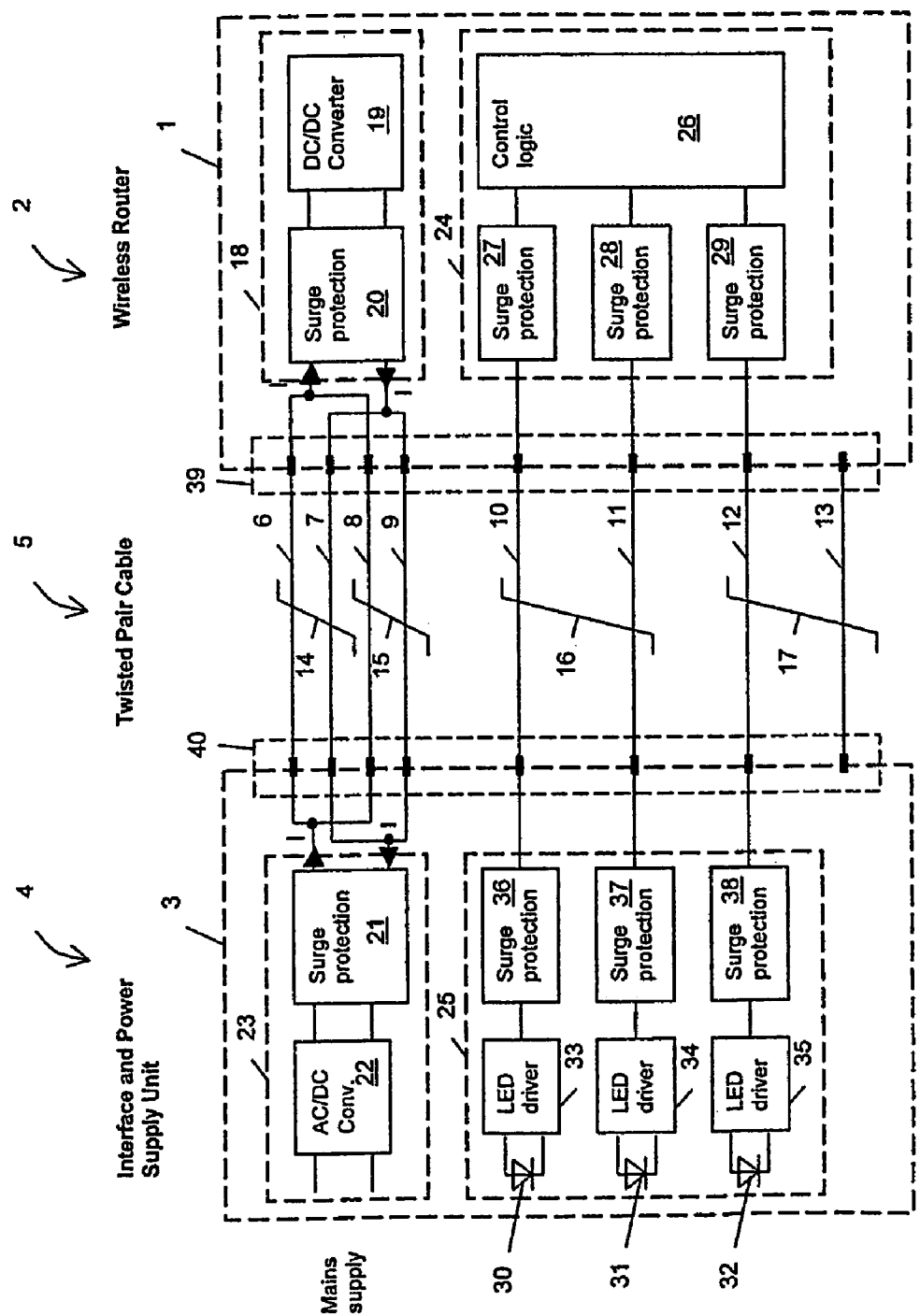
FIG. 1 shows a wireless router and an associated interface and power supply unit utilizing separate conductors for transmitting auxiliary date between the router and the interface and power supply unit according to the prior art.

FIG. 1 shows a data transmission apparatus 1 as being comprised in a wireless router 2 and a data receiving apparatus 3 as being comprised in an interface and power supply unit 4 associated with the router 2. The data transmission apparatus 1 and the data receiving apparatus 3 are interconnected by a cable 5 which is embodied as a data communication cable comprising a number of twisted pair conductors 6-13. Conductors 6 and 7, 8 and 9, 10 and 11, as well as 12 and 13 are respectively twisted with each other in order to form twisted pairs 14-17.

The data transmission apparatus 1 comprises a first electrical unit 18 comprising a DC/DC converter 19 for providing power to a load. DC/DC converter 19 is coupled with its two inputs with a surge protection unit 20 which in turn is coupled with its two inputs with two conductors 6, 8 and 7, 9, respectively. Conductors 6, 8 serve as a positive power line feeding a current from the interface and power supply unit 4 to the wireless router. Conductors 7, 9 serve as a negative power line returning said current from the wireless router 2 to the interface and power supply unit 4. Conductor 6 of the positive power line is twisted with conductor 7 of the negative power line. Similarly, conductor 8 of the positive power line is twisted with conductor 9 of the negative power line.

Conductors 6-9 are coupled at the end directed to the interface and power supply unit 4 with two inputs of a further surge protection unit 21. Surge protection unit 21 in turn is coupled with its two outputs with a AC/DC converter 22 that is receiving a voltage from a mains power supply and converting said voltage, which is an AC-voltage, to a DC-voltage. Thus, a DC current is transmitted across the positive power line from the interface and power supply unit 4 to the wireless router 2. This DC current is returned by the negative power line comprising the conductors 7, 9 from the wireless router 2 to the interface and power supply unit 4.

Surge protection unit 21 and AC/DC converter 22 constitute a second electrical unit 23. During installation, maintenance and use of the wireless router 2 it is useful to obtain some basic functional data about the status of the entire system, in particular about the wireless router 2. This functional data may include e.g. power on/off, software running, traffic ongoing, link established, and diagnostic status bits. This data should be visible to the user and therefore it must be transmitted from the wireless router 2 to a more convenient location near the user, namely the interface and power supply unit 4. This data should be visible also when a PC connected to the interface and power supply unit 4 is not operating normally or the Ethernet or Home PNA link is for some reason not operational. This requires an extra data channel between the wireless router 2 and the interface and power supply unit 4. According to the prior art solution shown in FIG. 1, this is accomplished with extra parallel conductors 10-13 between the wireless router 2 and the interface and power supply unit 4.

The above mentioned additional functional data is generated in a transmitter 24 and sent via conductors 10-13 to receiver 25. Transmitter 24 comprises a control logic 26 which is connected through surge protection units 27, 28, 29 with conductors 10, 11, 12, respectively. Conductor 13 is left unconnected.

The control logic 26 generates the functional data bits and transmits these bits via conductors 10, 11, 12 to receiver 25 in order to indicate these bits by LEDs 30, 31, 32 driven respectively by corresponding LED drivers 33, 34, 35 which are coupled via respective surge protection units 36, 37, 38 with conductors 10, 11, 12, respectively. LEDs 30, 31, 32, LED drivers 33, 34, 35 and surge protection units 36, 37, 38 are part of receiver 25.

Furthermore, communication data, in particular in the form of data packets, is transmitted between the wireless router 2 and the interface and power supply unit 4 via additional twisted pair conductors and data interfaces which both are not shown for clarity reasons.

Connectors 39, 40 are provided at both ends of the cable 5. Cable 5 is e.g. a data communication cable used in conjunction with Ethernet and Home PNA systems that uses e.g. AWG (American wire gauge) 24 wires. The diameter of these wires, however, is limited and restricts the maximum power which can be transferred from the interface and power supply unit 4 to the wireless router 2, for example to about 15 W with a 50-meter long cable. Making a special cable with separate power wires of larger diameter is not desirable as it leads to a more expensive customized cable. However, in order to reduce cable losses due to the limited wire diameters, two pairs are needed at minimum to provide acceptable power supply conditions at the wireless router 2. Therefore, two conductors 6, 8 are provided for the positive power line as well as two conductors 7, 9 are provided for the negative power line.

The present invention has realized that these pairs of conductors can be used to carry also other information in addition to their primary use of providing the DC power to the wireless router 2.

Figure 2:
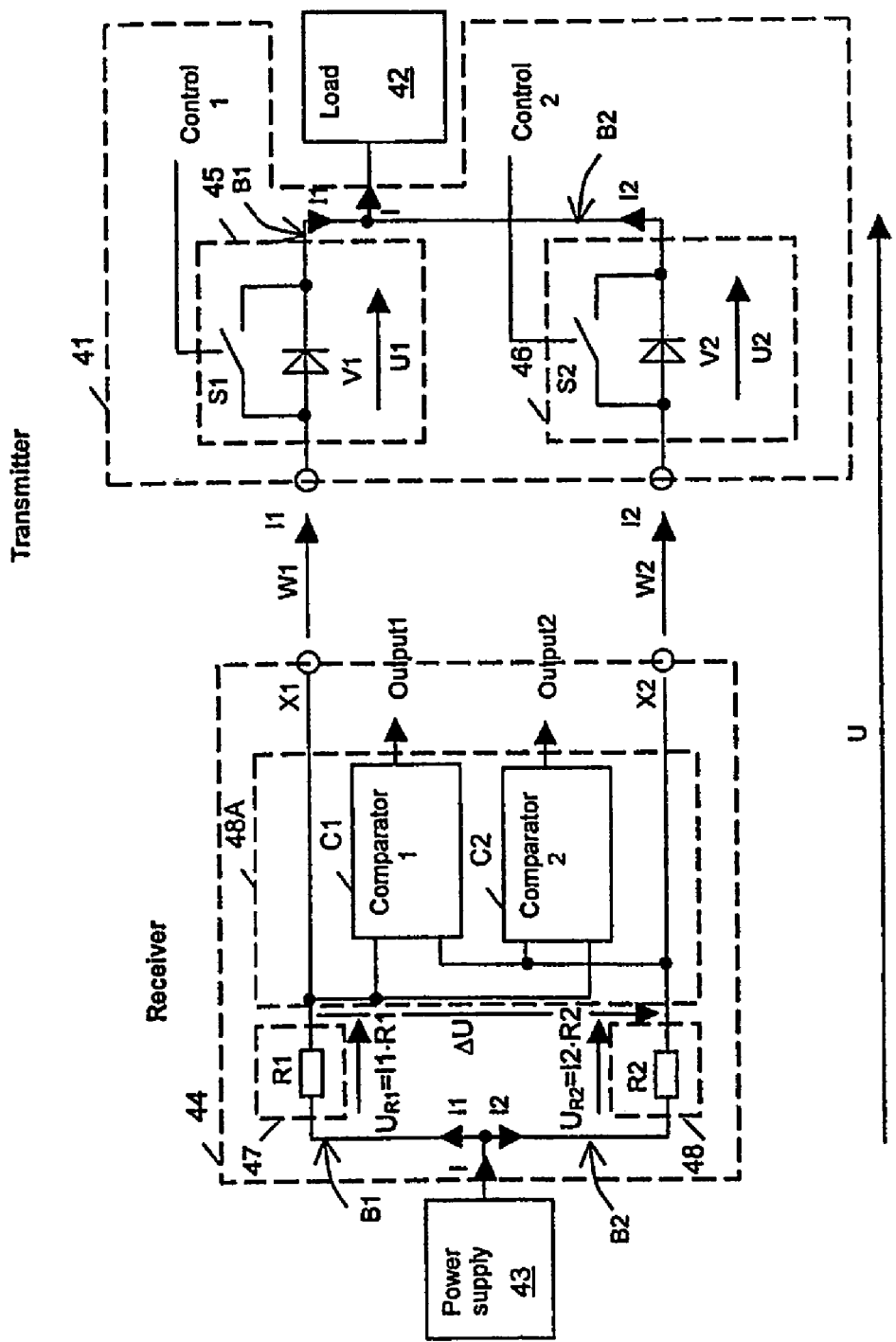
FIG. 2 shows a transmission and reception principle of auxiliary data transmission utilizing power conductors for transferring power from a power supply to a load according to a first embodiment of the present invention.

FIG. 2 shows an embodiment according to the present invention using the power lines between a wireless router and an interface and power supply unit. For the sake of simplicity and in order to explain the basic concept first, FIG. 2 shows just some of the components of such a system comprising a wireless router and a interface and power supply unit, namely the components necessary for transmitting the auxiliary functional data via one or both of the power lines.

In detail, FIG. 2 shows a transmitter 41 having similar functionality as transmitter 24 of FIG. 1, namely generating additional functional data and transmitting same.

Transmitter 41 is coupled in series between a first electrical unit 42 such as a load comprised in a wireless router and a pair of conductors W1, W2 corresponding to conductors 6, 8, shown in FIG. 1, constituting a positive power line transmitting power from a second electrical unit 43 via a receiver 44 and via transmitter 41 to the first electrical unit/load 42. Receiver 44 has basically same functionality as receiver 25, namely to receive and indicate the additional functional data transmitted from transmitter 41.

It is noted that for the sake of simplicity only the positive power line is shown in FIG. 2 transferring a current I from the second electrical unit/power supply 43 to the first electrical unit/load 42. However, this current I is divided in two branches, namely a first branch B1 for wire W1 and a second branch B2 for wire W2. Thus, a current I1 is transmitted from a second electrical unit/power supply 43 to the first electrical unit/load 42 via the first branch B1 and thus via wire W1. Correspondingly a second current I2 is transmitted from the second electrical unit/power supply 43 via wire W2 and thus via the second branch B2 to the first electrical unit/load 42. The sum of the first current I1 and the second current I2 is the current I.

According to the present invention auxiliary functional data is encoded into the current balance of any two parallel conductors, e.g. a pair of parallel conductors of the positive power line or of the negative power line. According to FIG.

2a pair of parallel conductors of the positive power line is used. By affecting the current balance by switchable serial elements 45, 46 any pair of current carrying wires (a pair of wires carrying a current either from the receiver 44 to the transmitter 41 or vice versa) can be used to transmit three data states (e.g. positive, neutral, and negative), encoded as a positive current balance state, a neutral balance state and a negative current balance state.

The positive current balance state is generated by opening the first switchable serial element 45 and by closing the second switchable serial element 46. Thus, in the first branch B1 transmitted via wire W1 a current I1 is generated that is smaller than the current I2 in the second branch B2 transmitted via wire W2.

The negative current balance state is generated by closing the first switchable serial element 45 and by opening the second switchable serial element 46 in order to generate a current I1 in the first branch B1 that is larger than a current I2 in the second branch B2.

The neutral current balance state is generated by same switching states of both, the first switchable serial element 45 and the second switchable serial element 46, i.e. both switchable serial elements being either opened or closed. Thus, substantially equal currents are generated in both branches B1, B2.

This principle can extended to n conductor pairs providing n×3 independent states of information.

The functional principle can be summarized as follows: The power supply 43 output current I is divided into two branches B1, B2 carrying currents I1 and I2. The load 42 at the other end of the wires W1 and W2 is connected to the power supply 43. Switchable serial elements 45, 46 comprise a respective switch S1, S2 coupled in parallel to respective serial elements, e.g. diodes V1, V2. If switches S1 and S2 are closed, the first path of the parallel current paths along branch B1 consists of the resistance $R_{W1}$ of the wire W1 and resistor R1 and the second path of the parallel paths along branch B2 consists of the resistance $R_{W2}$ of the wire W2 and the resistor R2.

Resistors R1 and R2 can be chosen to have equal resistances. As wires W1 and W2 are physically implemented in a twisted pair cable, it can be assumed that the resistances of wires W1 and W2 are within the same known, standardized tolerances. Therefore, it can be assumed that $$R1=R2 \quad \text{(Equation 1)}$$

and $$R_{W1}=R_{W2} \quad \text{(Equation 2)}$$

where $R_{W1}$, $R_{W2}$ denotes the DC resistance of the respective wire W1, W2.

The total resistances of both current paths are thus equal:

$$R1+R_{W1}=R2+R_{W2} \quad \text{(Equation 3)}$$

This results in equal currents in both paths:

$$I1=I2 \quad \text{(Equation 4)}$$

Thus, the total current I fed to the load is:

$$I=I1+I2 \quad \text{(Equation 5)}$$

If switch S1 is opened and switch S2 is closed, current I1 flows through the element V1 causing a voltage drop U1 across element V1. In this case the currents I1 and I2 can be calculated as follows:

$$I1=(U-U1)/(R1+R_{W1}) \quad \text{(Equation 6)}$$

$$I2=U/(R2+R_{W2})=U/(R1+R_{W1}) \quad \text{(Equation 7)}$$

In equations 4 and 5 U denotes the voltage drop between power supply 43 and load 42.

As a result:

$$I1-I2=(U-U1-U)/(R1+R_{W1}) \quad \text{(Equation 8)}$$

$$=-U1/(R1+R_{W1})$$

As R1 can be assumed much smaller than $R_{W1}$ equation 8 results in:

$$I1-I2 \approx -U1/R_{W1} \quad \text{(Equation 9)}$$

The result of the difference I1–I2 is not dependent on the load current I1+I2. This means that load variations are not seen in the data reception, just assuming some restrictions in selecting the component values.

The result of equation 9 is valid when the resistive voltage drop in the cable is larger than U1, otherwise I1=0 and the total load current flows through paths I2. In this case the load current variations can be seen as variation in current I2.

By opening the switch S2 a similar current asymmetry occurs as described above, however, with opposite polarity of the current difference I1–I2. As the system is symmetrical similar equations apply and are therefore not repeated here.

The switching operations of switches S1 and S2 can be detected in the receiver 44 by corresponding current detection units 47, 48 each one provided in one of both branches B1, B2 and a comparator circuit 48A. The first current detection unit 47 is embodied preferably as the above mentioned resistor R1. Correspondingly, the second current detection unit 48 is embodied as the above mentioned resistor R2. The comparator circuit 48A comprises a first comparator C1 coupled across both resistors R1, R2, and a second comparator C2 coupled across both resistors R1, R2 as well, wherein each of both comparators C1, C2 comprises a first input and a second input, wherein said first inputs and said second inputs are coupled across both resistors R1, R2 in opposite orientation to each other. Each comparator comprises an output for outputting a signal indication a bit of information depending on the current balance state.

The receiver 44 can thus detect three different current balance states, namely the above mentioned positive, neutral and negative current balance states. As the receiver detects a voltage difference ΔU across detection units 47, 48, the receiver detects corresponding positive, neutral and negative voltage difference states. However, a minimum load current is necessary in order to assure that a current difference or a voltage difference can be detected.

Figure 3:
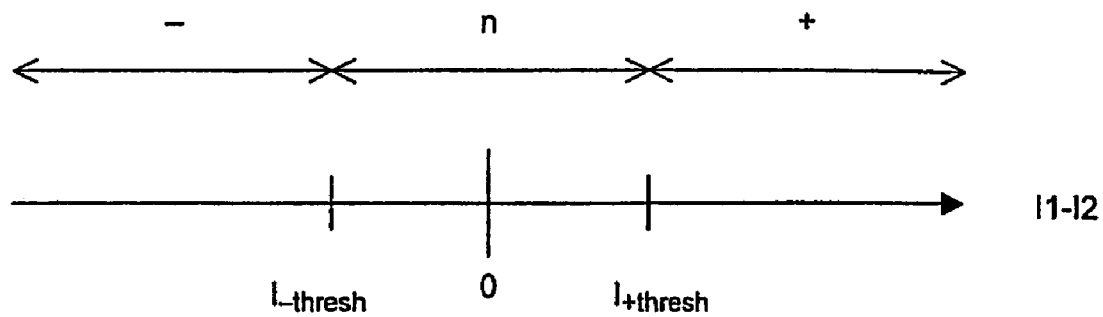
FIG. 3 shows a schematic diagram illustrating three different current balance states.

FIG. 3 shows the three states that can be transmitted by transmitter 41, namely the positive state "+", the neutral state "n" and the negative state "−". The positive state "+" is transmitted, if the current difference I1–I2 is larger than a positive detection threshold value $I_{+thresh}$. The neutral state "n" is transmitted if the current difference I1–I2 is less than the positive detection threshold value $I_{+thresh}$ and larger than a negative detection threshold value $I_{-thresh}$. A negative state is transmitted, if the current difference I1–I2 is less than the negative detection threshold value $I_{-thresh}$.

These states can assume different meanings depending on the application and the specific use of the data.

By selecting the voltage U1 across the element V1 and by selecting the voltage U2 across the element V2 relatively small and by choosing a low resistance value for R1 and R2 the power losses in the current paths can be held relatively small compared to the cable losses. Also maximum allowable wire resistances $R_{W1}$ and $R_{W2}$ are set, although they are usually dictated by power feed requirements.

Figure 4:
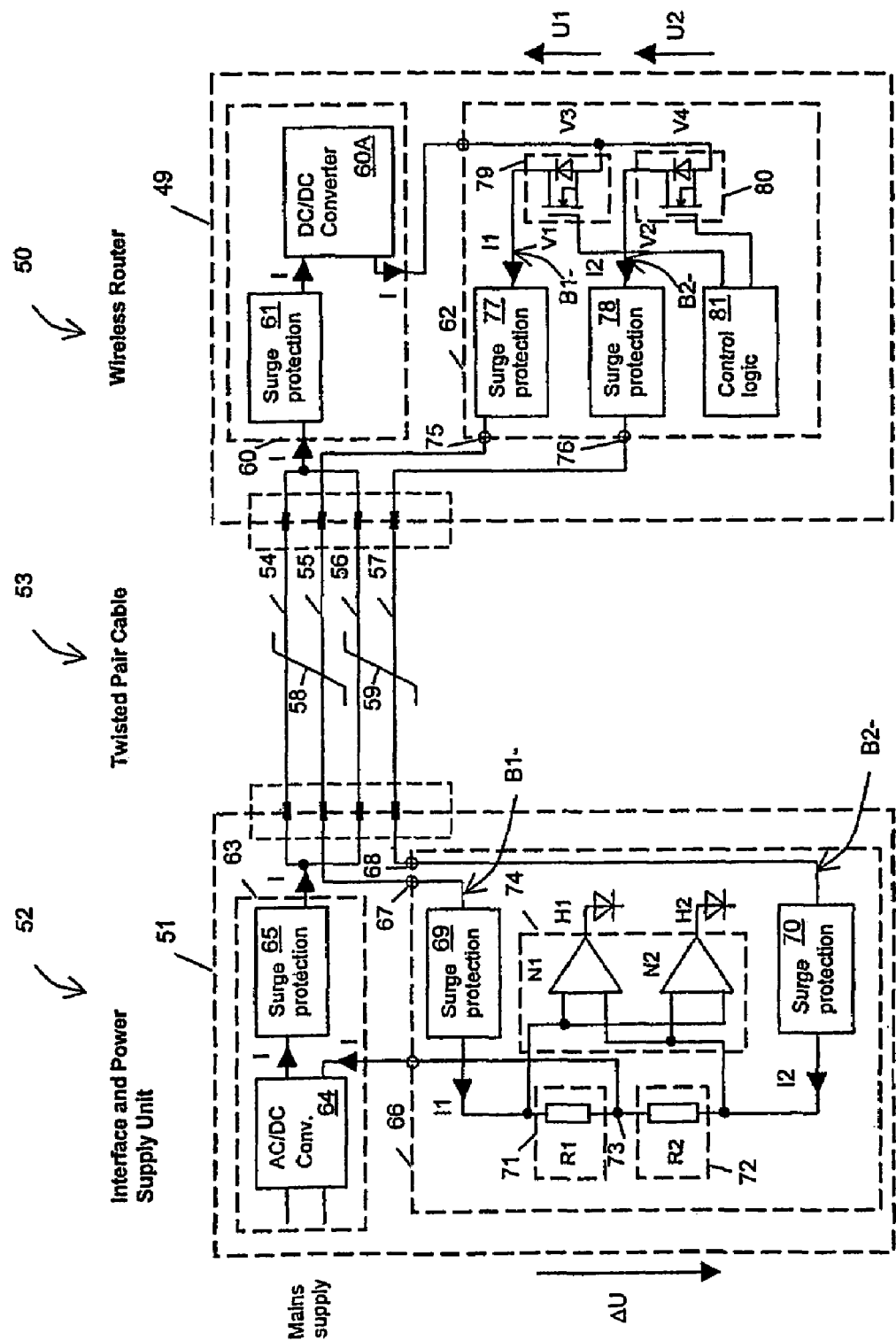
FIG. 4 shows a wireless router and an interface and power supply unit including a transmitter and a receiver for transmitting auxiliary data from the router to the interface and power supply unit via the power conductors of a data communication cable according to a second embodiment of the present invention.

FIG. 4 shows a second embodiment of the present invention. Basic components shown in FIG. 4 correspond to similar components shown in FIG. 1 and are therefore described just briefly. However, modifications of the system are described in greater detail below.

FIG. 4 shows a data transmission system according to a preferred embodiment including a data transmission apparatus 49 as it may be comprised in a wireless router 50 and a data receiving apparatus 51 as it may be comprised in a interface and power supply unit 52. A cable 53 is provided for connecting the data transmission apparatus 49 with a data receiving apparatus 51. The cable 53 comprises twisted pair conductors 54, 55, 56, 57, wherein conductors 54 and 55 constitute a first twisted pair 58 and conductors 56, 57 constitute a second twisted pair 59. Conductors 54, 56 form a pair of conductors of a positive power line transferring a current I from the interface and power supply unit 52 to the wireless router in two branches B1+, B2+, one branch in each of conductors 54, 56.

Conductors 55, 57 form the negative power line which returns the current I from the wireless router 50 to the interface and power supply unit 52, in two branches B1−, B2−, a first branch B1− via conductor 55 and a second branch B2− via conductor 57.

A first electrical unit 60 is connected to the positive power line, i.e. conductors 54, 56 via a surge protection unit 61. The first electrical unit 60 comprises a DC/DC converter and/or a load 60A. The current returned form the first electrical unit 60 is directed to a transmitter 62 that is connected in series between the first electrical unit 60 and the negative power line, i.e. conductors 55, 57.

The interface and power supply unit 52 comprises a second electrical unit 63 comprising an AC/DC converter 64 coupled via a surge protection unit 65 to the positive power line, i.e. conductors 54, 56. Furthermore, AC/DC converter 64 is coupled to a mains power supply.

The data receiving apparatus 51 further comprises a receiver 66 comprising an input 67, 68 for each of conductors 55, 57 of the negative power line. Such receiver inputs are constituted as electrical connector means for electrically connecting the conductors 55, 57.

Each of the receiver inputs 67, 68 is coupled via a surge protection unit 69, 70 to current detection means 71, 72 which are coupled in series with each other. The conjunction 73 between both current detection means 71, 72 is coupled with the AC/DC converter 64.

Comparator means 74 are provided across the connection in series of both current detection means 71, 72. The comparator means 74 in particular are able to evaluate a voltage difference across the connection in series of the current detection means 71, 72.

Comparator means 74 comprise two comparators N1, N2. Each of said comparators N1, N2 is coupled across both current detection means 71, 72. Each of both comparators N1, N2 comprise a first input and a second input respectively, wherein both first inputs and both second inputs are coupled across both current detection means 71, 72, however, in opposite orientation to each other.

The outputs of the comparators N1, N2 are respectively coupled with indicators H1, H2.

In a similar manner transmitter 62 comprises outputs 75, 76 for electrical connecting to conductors 55, 57 of the negative power line, respectively. Each of said transmitter outputs 75, 76 is protected with a surge protection unit 77, 78. The surge protection units 77, 78 are further connected with switchable serial elements 79, 80 that are designed to cause a switchable voltage drop U1, U2, respectively.

The switchable serial elements 79, 80 are further connected with a controller 81 controlling in particular the state of the switches comprised in the switchable serial elements 79, 80.

In detail, the switchable serial elements 79, 80 comprise switches V1 and V2. A constant voltage difference across an open switch V1, V2 is generated using elements V3, V4, e.g. diodes, respectively.

The switchable serial elements 79, 80 are connected in series with the connectors 55, 57 of a power line. The elements V3, V4 generating the voltage difference can be any resistive component or even an active circuit.

The elements V3, V4 are thus chosen so that the current difference at the receiver 66 is easily detectable. The switches V1, V2 may be e.g. a field effect transistor or a bipolar transistor or any other switching element. By using insulated gate field effect transistors the serial elements 79, 80 automatically contain a backward diode, respectively, which can be used to generate nearly constant voltage drops across the switchable serial elements 79, 80 when switches V1, V2 are opened.

Such a nearly constant voltage drop leads to a load independent current difference, as described above, between the parallel conductors of the pair of conductors belonging to a negative or positive power line. Thus, detection at the receiver 66 is facilitated.

Utilizing double insulated gate filed effect transistors integrates both transmitter switches and their backward diodes into a single low cost component. Using logic level insulated gate field effect transistors allows direct control from 5V logic.

Transmitter 62 is operated by driving the gates of the transistors V1 and V2 by means of controller 81. If the control voltage at a gate of one of transistors V1, V2 is high, the respective transistor is in conducting state and the voltage drop across the transistor is small. If the control voltage of the gate is low, the transistor is in the non-conducting state and the backward diode V3/V4 integrated into the switchable serial element 79/80 becomes active generating a nearly constant voltage drop across the element V3/V4. The voltage drop effects the current balance in both branches B1− and B2− as well as in the two parallel conductors 55, 57 as described above.

The receiver 66 comprises resistors R1 and R2 as current detection means 71, 72, respectively. The comparators N1 and N2 are preferably window comparators comprising an operational amplifier, respectively. The comparators N1, N2 are designed for detecting the current difference, i.e. the current balance between the two conductors 55, 57. Receiver 66 can detect the three different states, namely positive, neutral and negative current balance states.

Instead of the resistors R1 and R2, current detection means 71, 72 can provide any serial element capable of detecting a current difference, i.e. a current balance in conductors 55, 57.

Furthermore, the operational amplifiers N1 and N2 can be replaced by any other device capable of detecting the voltage difference across both current detection means 71, 72.

Comparators N1 and N2 are constituted of e.g. operational amplifiers constructed to measure the voltage different across resistors R1 and R2, wherein detection threshold values can be set simply by generating voltage differences $U_{-thresh}$ and $U_{+thresh}$ to the differential inputs of the operational amplifiers.

Figure 5:
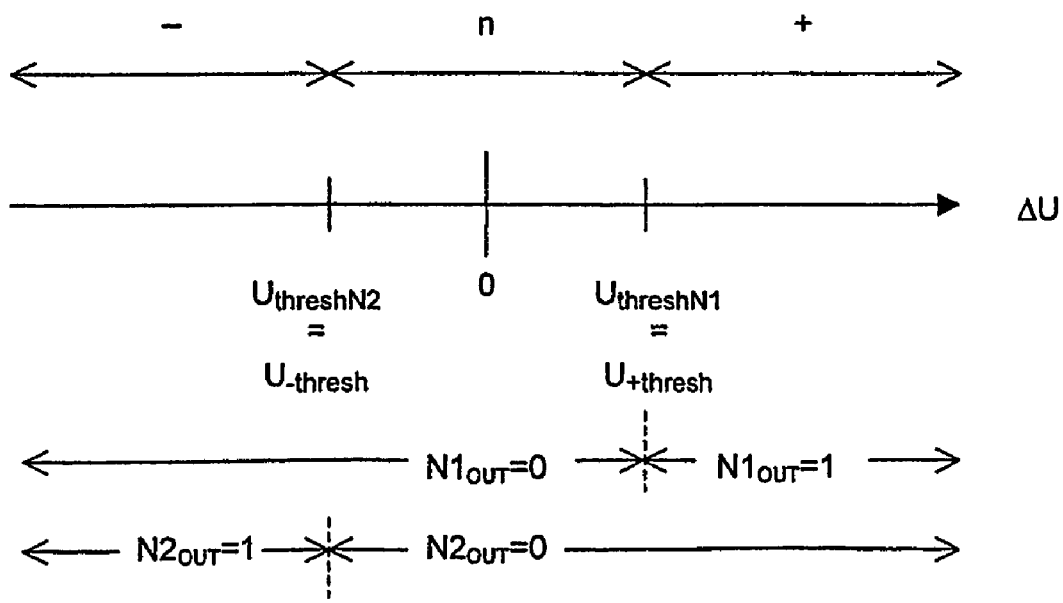
FIG. 5 shows a schematic diagram illustrating output signals from comparators shown in FIG. 4 depending on a voltage difference between the power conductors resulting from the current balance states illustrated in FIG. 3.

As shown in FIG. 5, when the voltage difference ΔU across resistors R1 and R2 is smaller than the threshold voltage $U_{+thresh}$ and $U_{-thresh}$ both comparator outputs are low. If the voltage difference ΔU becomes larger than $U_{+thresh}$ the output of the comparator N1 is high, thus driving the indicator H1 on. If the negative voltage difference becomes larger than the negative threshold value $U_{-thresh}$, the output of the comparator N2 is high and the indicator H2 is on.

FIG. 5 illustrates the outputs $N1_{OUT}$, $N2_{OUT}$ of the comparators N1, N2 depending on the voltage difference ΔU across resistors R1 and R2. As being illustrated in FIG. 5, a positive current balance state "+" results in a voltage difference ΔU that is larger than the threshold value of comparator N1, namely $U_{treshN1}$ corresponding to $U_{+thesh}$. On the contrary, if the negative voltage difference ΔU is larger than the threshold value of comparator N2, namely $U_{threshN2}$, corresponding to $U_{-thresh}$, a negative current balance state "−" is detected. If, however, the voltage difference ΔU is between $U_{threshN1}$ and $U_{threshN2}$, a neutral current balance state is detected. In FIG. 5a high output at a comparator is indicated by "1", whereas low output is indicated by "0".

The embodiment shown in FIG. 4 utilizes the branches B1−, B2− corresponding to the power return line comprising conductors 55, 57, only. However, the principle can be extended to both, the positive and negative power lines of a single power feed line pair, i.e. to branches B1+, B2+ and thus to conductors 54, 56 as well. Such an extension allows carrying two independent sets of three state data on one pair of lines.

In the implementation shown in FIG. 4, data is transferred to one direction only. Using transmitters and receivers at both ends of the cable 53—such that the wireless router 50 or the data transmission apparatus 49 on the one hand as well as the interface and power supply unit 52 or the data receiving apparatus 51 on the other hand each comprise a receiver as well as a transmitter—enables half-duplex data to be transferred to both directions. Using both current supply pairs, namely positive and negative power lines, enables full-duplex data transmission.

Furthermore, if more than one power supply is used, the above described principle can be extended to any number of power line pairs. Furthermore, the data can be any kind of data, in particular parallel to serial converted data that is converted in the transmitter and decoded back to parallel format at or after the receiver. This allows an unlimited number of bits of information to be transmitted through the power lines. Data transmission efficiency can be further enhanced by using more complex coding techniques if necessary.

It is noted, that the present invention does not need any changes to the power supplies and their filtering does not need to be isolated or modified in any way. The data transmission does not cause any significant current changes to the prevailing load. It only changes the current balance between the two current carrying conductors.

Any notable EMC (electromagnetic compatibility) emission can be prevented by using corresponding, moderately low modulation rates and slow switching. Detector susceptibility to power line EMC can be reduced easily with simple low pass filters.

Table 1 shows, how received data can easily be manipulated to achieve two apparently independent data bits out of one three state input information.

TABLE 1

| T1 | T2 | $N1_{OUT}(T1)$ | $N2_{OUT}(T1)$ | $N1_{OUT}(T2)$ | $N2_{OUT}(T2)$ | $N1_{OUT}(T1+T2) =$ $M1_{OUT}(T1)$ v $N1_{OUT}(T2)$ | $N2_{OUT}(T1+T2) =$ $N2_{OUT}(T1)$ v $N2_{OUT}(T2)$ |
|---|---|---|---|---|---|---|---|
| n | n | 0 | 0 | 0 | 0 | 0 | 0 |
| + | + | 1 | 0 | 1 | 0 | 1 | 0 |
| − | − | 0 | 1 | 0 | 1 | 0 | 1 |
| + | − | 1 | 0 | 0 | 1 | 1 | 1 |

By alternating the data sent during consecutive periods of time T1 and T2, two apparently independent output bits can be produced if the outputs at the comparators N1 and N2 are integrated over periods T1 and T2.

The first two columns of table 1, namely column T1 and T2 indicate the current balance state at time T1 and T2, respectively. Columns 3 and 4 of table 1 indicate the outputs of comparators N1 and N2, respectively, depending on the current balance state at time T1. As indicated in FIG. 5, a neutral current balance state results in an output "0" in both, comparator 1 and comparator 2. A positive current balance state results in an output "1" at comparator N1, whereas a positive current balance state results in an output "0" at comparator N2.

A negative current balance state "−" results in an output "0" at comparator N1, whereas a negative current balance state "−" results in an output "1" at comparator N2.

In a similar manner, columns 5 and 6 of table 1 are produced at time T2.

Columns 7 and 8 of table 1 indicate the outputs at comparators N1, N2, respectively, if the respective outputs are integrated over time periods T1 and T2. Such an integration results in a logical OR function combining the output of a comparator at time T1 with the corresponding output at time T2.

If the output information from comparators N1, N2 is used e.g. for visual information, e.g. through LEDs, the integration can be left out and it can be taken advantage of the slow response of the human eye by driving the LEDs with at least 50% duty cycle using frequencies where the human eye does not see a flicker but a constant light, e.g. by using a frequency of 50 Hz or above 50 Hz. By using duty cycles below 100% the power consumption can be decreased. However, the LEDs can also be used for flickering or flashing light.

In a preferred embodiment a data to be sent from the wireless router to the interface and power supply unit is produced such that only the negative power return line is used for transmitting the data. Such an arrangement can utilize ground referenced control voltages and positive control voltages automatically available in both units, the wireless router and the interface and power supply unit. This polarity also allows the use of low cost N-channel insulated gate field effect transistors.

A preferred switching element is a double N-channel insulated gate field effect transistor. This type of transistor integrates all the functional elements needed in the transmitter 62. Using a backward diode as a parallel element with the transistor providing a nearly constant voltage drop is beneficial both, due to its load current independent characteristics and also due to the fact that the power losses are not increased in square in relation to the load current like using resistive elements.

For higher efficiency the integration effect described above with reference to table 1 can be used. It is noted, that this principle does not exclude the use of blinking with lower visual frequency to be used as additional diagnostic information.

It is noted that the present invention is not restricted to the preferred embodiments described above. In particular, encoding and decoding of the information can be performed in either, the positive or negative power lines or in both, positive and negative power lines. Furthermore, the principle of the invention can be extended to several parallel similar circuits. By utilizing theses measures, information can be transferred to both directions using half-duplex or full-duplex communication. Furthermore, the present invention is not restricted to router-interface and power supply unit systems, but can be applied to other systems as well with similar remotely located devices utilizing centralized power feed systems, in particular using data communication cables. Furthermore, the information can be any kind of information, not only additional functional auxiliary data. Thus, the preferred embodiments may vary within the scope of the attached claims.

The invention claimed is:

1. A transmitter for transmitting data to a receiver via a cable, comprising at least two current conducting branches, wherein said cable comprises at least two conductors respectively connectable with said branches for conducting a current either from said receiver to said transmitter or vice versa, said current being divided in said two branches, a first branch for a first one of said conductors and a second branch for a second one of said conductors, and means for encoding data to be transmitted via said cable to said receiver by altering the current balance between the currents in said two branches.

2. A transmitter according to claim 1, wherein said current is a power supply current being fed from a power supply to a load or returned from said load to said power supply and wherein said branches are capable to said power supply and wherein said branches are capable of feeding said current.

3. A transmitter according to claim 2, further comprising a power feed connector means for each branch for respectively connecting each branch with one of said conductors.

4. A transmitter according to claim 1, wherein said encoding means comprise a switchable element for each branch, respectively, each switchable element being connected in series in the respective branch.

5. A transmitter according to claim 4, wherein said encoding means further comprise a resistive element and/or a diode respectively coupled across said switchable elements.

6. A transmitter according to claim 4, wherein said switchable elements are coupled with a controller for controlling said switchable elements, said controller being designed for control-ling said switchable elements so that said switchable elements have in both branches either the same switching state or different switching states in order to generate one of three different current balance states.

7. A transmitter according to claim 6, wherein said three current balance states are: a neutral current balance (n) state generated by same switching states in both branches in order to generate substantially equal currents in both branches, a negative current balance state generated by closing a first one of both switchable elements and by opening a second one of both switchable elements in order to generate a larger current in the first branch than in the second branch, and a positive current balance state generated by opening the first one of both switchable elements and by closing the second one of both switchable elements in order to generate a smaller current in the first branch than in the second branch.

8. A transmitter according to claim 6, wherein said switchable elements respectively comprise a transistor with its gate coupled to said controller.

9. A transmitter according to claim 8, wherein said transistor is an insulated gate field effect transistor.

10. A transmitter according to claim 9, wherein said insulated gate field effect transistor is a N-channel insulated gate field effect transistor.

11. A transmitter according to claim 9, wherein said insulated gate field effect transistor is a double N-channel insulated gate field effect transistor.

12. A transmission apparatus comprising a transmitter according to claim 1, an electrical unit comprising a load or a power supply, wherein said transmitter being connected in series between said at least two conductors and said electrical unit, and wherein said conductors are at least part of a positive power line feeding a current from said power supply to said load or at least part of a negative power line returning said current from said load to said power supply.

13. A transmission apparatus according to claim 12 further comprising a receiver connected in series between said conductors and said electrical unit, in order to enable half-duplex data transmission between said transmission apparatus and a receiving apparatus.

14. A transmission apparatus according to claim 12 further comprising a receiver connected in series between at least two further conductors and said electrical unit, in order to enable full-duplex data transmission between said transmission apparatus and a receiving apparatus, wherein said further conductors are at least part of said positive power line or at least part of said negative power line.

15. A transmission apparatus according to claim 12, wherein said transmission apparatus being a network interface and power supply unit.

16. A transmission apparatus according to claim 12, wherein said transmission apparatus being a router.

17. A transmission apparatus according to claim 16, wherein said router being a wireless router.

18. A receiver for receiving data from a transmitter via a cable, comprising at least two current conducting branches, wherein said cable comprises at least two conductors respectively connectable with said branches for conducting a current either from said receiver to said transmitter or vice versa, said current being divided in said two branches, a first branch for a first one of said conductors and a second branch for a second one of said conductors, and means for decoding data being transmitted via said cable from said transmitter by evaluating alterations of the current balance between the currents in said two branches.

19. A receiver according to claim 18, wherein said current is a power supply current being fed from a power supply to a load or re-turned from said load to said power supply and wherein said branches are capable to said power supply and wherein said branches are capable of feeding said current.

20. A receiver according to claim 19, further comprising a power feed connector means for each branch for respectively connecting each branch with one of said conductors.

21. A receiver according to claim 18, wherein said decoding means comprise current detection means for each branch, respectively, for detecting the currents in the respective branches.

22. A receiver according to claim 21, wherein said current detection means is a resistor connected in series in the respective branch.

23. A receiver according to claim 21, wherein said current detection means are coupled with comparator means for comparing values indicating the currents detected by said current detection means, said comparator means being designed for detecting one of three different current balance states.

24. A receiver according to claim 23, wherein said three different current balance states are: a neutral current balance state detected if said values of both currents are substantially equal, a negative currents balance state detected if said value referring to a first one of both branches is larger than the value referring to a second one of both branches, and a positive current balance state detected if said value referring to said first branch is smaller than the value referring to said second branch.

25. A receiver according to claim 23, wherein said current detection means of both branches are coupled in series with each other and wherein said comparator means comprise a first comparator (C1; N1) coupled across both current detection means, and a second comparator coupled across both current detection means, wherein each of both comparators comprises a first input and a second input, wherein said first inputs and said second inputs are coupled across both current detection means in opposite orientation to each other.

26. A receiver according to claim 25, wherein said first comparator outputs a high level signal if a voltage difference between its first and second inputs is above a first threshold value and outputs a low level signal if said voltage difference is below said first threshold value, and wherein said second comparator outputs a low level signal if a voltage difference between its first and second inputs is above a second threshold value and outputs a high level signal if said voltage difference is below said second threshold value.

27. A receiver according to claim 25, wherein said first comparator comprises an output coupled with a first indicator, and wherein said second comparator comprises an output coupled with a second indicator.

28. A receiver according to claim 27 wherein said first and second indicators integrate the outputs of said respective first and second comparators over two consecutive periods of time.

29. A receiver according to claim 28, wherein said indicators are light emitting diodes.

30. A receiver according to claim 29, wherein said light emitting diodes are driven with at least 50% duty cycle using a frequency which is seen as a constant light.

31. A receiver according to claim 30 wherein said duty cycle is below 100%.

32. A receiver according to claim 30, wherein said frequency is 50 Hz or higher.

33. A receiver according to claim 32, wherein said light emitting diodes are driven in order to generate flickering or flashing light.

34. A receiving apparatus comprising a receiver according to claim 18, an electrical unit comprising a power supply or a load, wherein said receiver being connected in series between said at least two conductors and said electrical unit, and wherein said conductors are at least part of a positive power line feeding a current from said power supply to said load or at least part of a negative power line returning said current from said load to said power supply.

35. A receiving apparatus according to claim 34, further comprising a transmitter connected in series between said conductors and said electrical unit, in order to enable half-duplex data transmission between said receiving apparatus and a further transmission apparatus.

36. A receiving apparatus according to claim 34 further comprising a transmitter connected in series between at least two further conductors and said electrical unit, in order to enable full-duplex data transmission between said receiving apparatus and a transmission apparatus, wherein said further conductors are at least part of said positive power line or at least part of said negative power line.

37. A receiving apparatus according to claim 34, wherein said receiving apparatus being a network interface and power supply unit.

38. A receiving apparatus according to claim 34, wherein said receiving apparatus being a router.

39. A receiving apparatus according to claim 38, wherein said router being a wireless router.

40. A transmission and receiving system for transmitting data, comprising
a transmission apparatus comprising a transmitter, an electrical unit comprising a load or a power supply, wherein said transmitter being connected in series between said at least two conductors and said electrical unit, and wherein said conductors are at least part of a positive power line feeding a current from said power supply to said load or at least part of a negative power line returning said current from said load to said power supply,
a receiving apparatus according to claim 34,
wherein said transmission apparatus and said receiving apparatus are connected with each other by said cable.

41. A system according to claim 40, wherein said cable is a data communication cable comprising at least two conductors as said positive power line, at least two conductors as said negative power line, and at least two conductors as a main data communication line, wherein said power lines are usable for supplying power from said power supply to said load as well as for data transmission.

42. A system according to claim 40, wherein said cable comprises a number of twisted pair conductors.

43. A system according to claim 42, wherein said number of twisted pair conductor is 3, 4 or 5.

44. A method for transmitting data via a cable, said cable comprising at least two conductors for conducting a current either from a receiver to a transmitter or vice versa, said current being divided in two current conducting branches, a first branch for a first one of said conductors and a second branch for a second one of said conductors, comprising the step of encoding data to be transmitted via said cable by altering the current balance between the currents in said two branches.

45. A method according to claim 44, wherein said current is a power supply current, said method comprising the further step of feeding said power supply current from a power supply to a load or returning said current from said load to said power supply.

46. A method according to claim 44, wherein said current is fed via a power feed connector means for each branch for respectively connecting each branch with one of said conductors.

47. A method for receiving data via a cable, said cable comprises at least two conductors for conducting a current either from a receiver to a transmitter or vice versa, said current being divided in two current conducting branches, a first branch for a first one of said conductors and a second branch for a second one of said conductors, comprising a step of decoding data transmitted via said cable from said transmitter by evaluating alterations of the current balance between the currents in said two branches.

48. A method according to claim 47, wherein said current is a power supply current, said method comprising the further step of feeding said power supply current from a power supply to a load or returning said current from said load to said power supply.

49. A method according to claim 48, wherein said current is fed via a power feed connector means for each branch for respectively connecting each branch with one of said conductors.

* * * * *